(12) United States Patent
Starkovich et al.

(10) Patent No.: US 9,688,827 B1
(45) Date of Patent: Jun. 27, 2017

(54) METHOD FOR PREPARING HIGH QUALITY TENDRILLAR CARBON NON-WOVEN PRE-IMPREGNATED AND COMPOSITE MATERIALS

(71) Applicant: Northrop Grumman Systems Corporation, Falls Chruch, VA (US)

(72) Inventors: John A. Starkovich, Redondo Beach, CA (US); Hsiao-Hu Peng, Rancho Palos Verdes, CA (US); Edward M. Silverman, Encino, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/250,071

(22) Filed: Aug. 29, 2016

(51) Int. Cl.
*C08J 9/32* (2006.01)
*C08J 5/24* (2006.01)
*C08K 7/00* (2006.01)
*C08K 3/04* (2006.01)

(52) U.S. Cl.
CPC ........ *C08J 5/24* (2013.01); *C08K 3/04* (2013.01); *C08K 7/00* (2013.01); *C08J 2379/04* (2013.01); *C08K 2201/011* (2013.01)

(58) Field of Classification Search
CPC ... C08K 9/04; C08K 3/04; C08F 122/40; C08L 63/00
See application file for complete search history.

(56) References Cited

U.S. PATENT DOCUMENTS

| | | | |
|---|---|---|---|
| 9,115,263 B2 | 8/2015 | Cheng et al. | |
| 2008/0053011 A1 * | 3/2008 | Sironko | B29C 70/443 52/204.1 |
| 2009/0227162 A1 | 9/2009 | Kruckenberg et al. | |
| 2010/0178825 A1 * | 7/2010 | Shah | D02G 3/16 442/188 |
| 2011/0045274 A1 | 2/2011 | Bao et al. | |
| 2012/0289112 A1 | 11/2012 | Mao et al. | |
| 2013/0344325 A1 * | 12/2013 | Nguyen | B32B 5/10 428/343 |
| 2015/0027304 A1 | 1/2015 | Sims et al. | |

OTHER PUBLICATIONS

Lao, S.C., et al; Processing and Characterization of Cyanate Ester-MWNT Nanocomposites; In 54th AIAA/ASME/ASCE/AHS/ASC Structures, Structural Dynamics, and Materials Conference, p. 1581. 2013.
Cheng, Q. et al; Fabrication and properties of aligned multiwalled carbon nanotube-reinforced epoxy composites; Journal of Materials Research, vol. 23, No. 11, Nov. 2008; pp. 2975-2983.
Lashmore, D. S. et al; Synthesis and Properties of CNT Composites; 2 pages; USA.
New NCC company to explore nanomaterials: Buckeye Composites will focus on production of carbon fiber-based puckypaper in wide, continuous lengths for aerospace and other applications; http://www.compositesworld.com/news/new-ncc-company-to-explore-nanomaterials.

* cited by examiner

*Primary Examiner* — Hannah Pak
(74) *Attorney, Agent, or Firm* — Patti & Malvone Law Group, LLC

(57) ABSTRACT

A method for infusing a nanoporous tendrillar mat with resin includes: performing a short duration, elevated temperature, pre-cure contacting treatment of the tendrillar mat using resin, thereby substantially uniformly infusing the tendrillar mat with resin; and curing the resin-infused tendrillar mat.

16 Claims, 1 Drawing Sheet

METHOD FOR PREPARING HIGH QUALITY TENDRILLAR CARBON NON-WOVEN PRE-IMPREGNATED AND COMPOSITE MATERIALS

SUMMARY

A method for infusing a nanoporous tendrillar mat with resin includes: performing a short duration, elevated temperature, pre-cure contacting treatment of the tendrillar mat using resin, thereby substantially uniformly infusing the tendrillar mat with resin; and curing the resin-infused tendrillar mat.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

DETAILED DESCRIPTION

Figure 1:
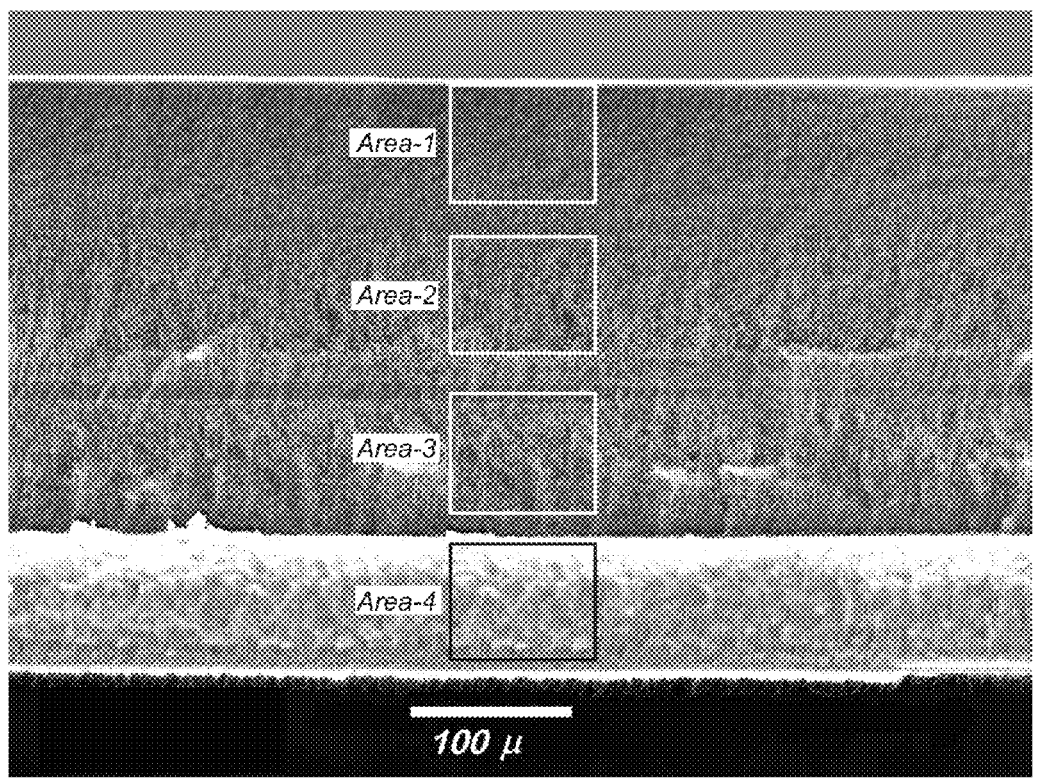
FIG. 1 is a scanning electron photomicrograph of four different areas, in a 4-ply composite produced according to embodiments of the invention.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

This invention disclosure describes a method for infusing nonwoven carbon nanotube (CNT) and other tendrillar sheet materials with high performance resins for producing very uniform composition pre-impregnated and multi-ply nanocomposites. For example, the resin comprises one or more of polycyanate and epoxy. According to embodiments of the invention, a short duration, elevated temperature, pre-cure contacting treatment thoroughly and uniformly infuses CNT sheet materials with resin, producing substantially void-free laminate structures.

The tendrillar mat structure comprises one or more of carbon nanotubes (CNT's), carbon nanofibers (CNF), filamentous carbon, boron nitride, aluminum, glass, nanowires, and ceramics.

The elevated temperature and contacting period used in the pretreatment does not advance a degree of cure beyond approximately 10% while at the same time producing a resin having a low viscosity. For example, a resin is produced having a viscosity of between approximately 0.180 pascal-second (Pa-s), or 180 centipoise (cps) and approximately 0.320 Pa-s, or 320 cps.

According to embodiments of the invention, high quality nanocomposites comprising one or more of consolidated tendrillar sheet products and unconsolidated tendrillar sheet products use a judiciously selected elevated temperature pretreatment for contacting resin and sheet material. The proper pretreatment simultaneously provides a low viscosity resin and a low cure rate.

The innovative concept behind this invention disclosure is the discovery/identification of special processing conditions for preparing uniformly filled single nonwoven tendrillar sheet materials comprising high performance polycyanate resins and one or more of filamentary type carbon materials and multi-ply composite products. For example, the filamentary type carbon materials comprise CNT. The particular class of resins of interest are the high performance 180° C. cure polycyanate esters. A representative member of this resin class is RS-3 RS-3 resin, which is manufactured by TenCate Advanced Composites of Morgan Hill, Calif. (www.Tencate/advancedcomposites.com).

A pretreatment processing temperature of 120° C. reduces resin viscosity to between approximately 0.18 pascal-second (Pa-s), or 180 centipoise (cps), and approximately 0.32 pascal-second (Pa-s), or 320 centipoise (cps). For example, the pretreatment processing temperature of 120° C. reduces resin viscosity to approximately 0.20 pascal-second (Pa-s), or 200 centipose (cps), and was found to permit substantially complete resin infusion of a 4-ply laminate stack in less than approximately 20 minutes. For example, the pretreatment time is between approximately 15 minutes and approximately 30 minutes.

For example, the pretreatment processing temperature is between approximately 110° C. and approximately 125° C. For example, the resin infusion percentage is greater than approximately 99%. A homogeneous surface is thereby produced that looks smooth and continuous to the eye and is substantially free of visual defects. Bubbles and voids within the lamina are minimized. For example, the resin-infused tendrillar mats comprise less than approximately 3% voids. For example, the resin-infused tendrillar mats comprise less than approximately 1% voids. For example, the resin-infused tendrillar mats comprise less than approximately 0.1% voids. The resin-infused tendrillar mat has a reticular structure in which the tendrillar particles spacings in the composite are no more than approximately 50 nanometers to approximately 100 nanometers (50-100 nm) apart. Upon increasing the laminate processing temperature to 177° C., completion of the cure is effected in an additional ~100 min.

FIG. 1 is a scanning electron photomicrograph 100 of four different areas 110, 120, 130, and 140 in a 4-ply CNT composite produced according to embodiments of the invention. The substantially uniform and substantially complete infusion can be observed visually in FIG. 1. As shown in FIG. 1, the fracture crossection of the part reveals no bubbles or apparent voids and a very uniform chemical composition across the surface. As shown in FIG. 1, the areas 110, 120, 130, and 140 each have a linear dimension of approximately 100 microns (100μ).

Further evidence of the substantially uniform and substantially complete infusion of a 4-ply composite is provided in the scanning electron photomicrograph presented in Table 1. Elemental analysis using the K-alpha line in an X-ray analysis of the four areas reveals a consistent uniform composition across the thickness of the laminate. Examination of the fracture crossection of the part reveals no bubbles or apparent voids and a very uniform chemical composition across the surface where the coefficient of variation for the N:O atomic ratio is less than 8%. The N:O atomic ratios for the four areas can be calculated to be: 1.82 for Area 1, 1.62 for Area 2 and also for Area 3, and 1.47 for Area 4:

TABLE 1

| Element | Weight Percentage % | Atomic Percentage % |
|---|---|---|
| Area 1 | | |
| C | 80.47 | 84.82 |
| N | 10.42 | 9.42 |
| O | 6.54 | 5.18 |
| Fe | 2.57 | 0.58 |
| Total | 100.00 | 100.00 |
| Area 2 | | |
| C | 81.71 | 85.97 |
| N | 9.21 | 8.31 |
| O | 6.50 | 5.14 |
| Fe | 2.58 | 0.58 |
| Total | 100.00 | 100.00 |
| Area 3 | | |
| C | 80.76 | 84.93 |
| N | 9.99 | 9.01 |
| O | 7.04 | 5.56 |
| Fe | 2.21 | 0.50 |
| Total | 100.00 | 100.00 |
| Area 4 | | |
| C | 80.47 | 84.82 |
| N | 10.42 | 9.42 |
| O | 6.54 | 5.18 |
| Fe | 2.57 | 0.58 |
| Total | 100.00 | 100.00 |

Figure 2:
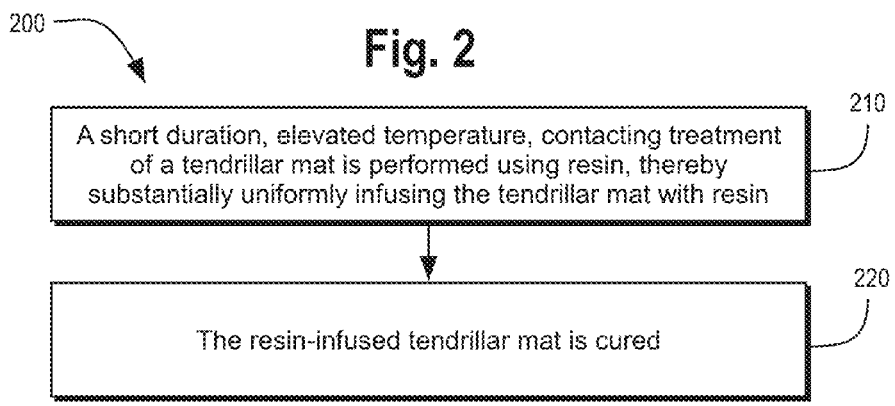
FIG. 2 is a flowchart of a method for infusing a tendrillar mat with resin.

FIG. 2 is a flowchart of a method 200 for infusing a tendrillar mat with resin. The order of steps in the method 200 is not constrained to that shown in FIG. 2 or described in the following discussion.

In step 210, a short duration, elevated temperature, contacting treatment of a tendrillar mat is performed using resin, thereby substantially uniformly infusing the tendrillar mat with resin. Block 210 then transfers control to block 220.

In step 220, the resulting resin-infused tendrillar mat is cured. Block 220 then terminates this process.

For example, the curing step is performed for a time of approximately 100 minutes. For example, the curing step is performed for a time of between approximately 90 minutes and approximately 120 minutes.

Embodiments of the invention provide numerous benefits. Nanocomposite materials have a myriad of applications that include: thermal management systems, ballistic protection fabrics and shields, engine and thruster components, EMI shielding, composite mirror fabrication, low permeability composite tanks and dimensionally stable structures. For many of these applications the use of high performance but difficult to process resins such as polycyanate esters is desirable. Due to their high quality, nanocomposites produced according to embodiments of the invention are suitable for an exceptionally broad range of applications. They have an attractive set of properties for aerospace applications that includes: high glass transition temperature (250° C.), low moisture absorption (0.7%), low outgassing (<0.2%), and an approximate curing temperature of 180° C. For example, the curing temperature is between approximately 150° C. and approximately 190° C. Embodiments of the invention achieve ready flow through a highly absorptive nanoporous medium.

The elevated temperature and contacting period used in the pretreatment does not advance a degree of cure beyond approximately 10% while at the same time producing a resin having a low viscosity. For example, a resin is produced having a viscosity of between approximately 0.18 pascal-second (Pa-s), or 180 centipoise (cps), and approximately 0.32 pascal-second (Pa-s), or 320 centipoise (cps). The degree of cure at this infusion/pretreatment temperature is only equal to approximately 10% so that the resin remains flowable/infusible during the pretreatment period.

It will be further understood by those of skill in the art that the number of variations of the invention and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

We claim:

1. A method for infusing a nanoporous tendrillar mat with resin, comprising: performing a short duration, elevated temperature, contacting treatment of the tendrillar mat using resin, thereby uniformly infusing the tendrillar mat with the resin, wherein the performing step is performed for a time between 15 minutes and 30 minutes; and the elevated temperature comprises a temperature of between 110° C. and 125° C.; and curing the resin-infused tendrillar mat, wherein the resin has a coefficient of variation for an N:O atomic ratio of nitrogen to oxygen of less than 8%.

2. The method of claim 1, wherein the mat structure comprises one or more of carbon nanotubes (CNT's), carbon nanofibers (CNF), filamentous carbon, boron nitride, aluminum, glass, nanowires, and ceramics.

3. The method of claim 1, wherein the resin comprises one or more of polycyanate and epoxy.

4. The method of claim 3, wherein the resin comprises polycyanate resin.

5. The method of claim 4, wherein the resin comprises polycyanate resin having a cure temperature of 180° C.

6. The method of claim 1, wherein the performing step does not advance a degree of cure of the mat beyond 10%.

7. The method of claim 1, wherein the performing step produces a resin having a low viscosity, wherein the resin has a viscosity of between 180 centipoise (cps), and 320 centipoise (cps).

8. The method of claim 1, wherein the performing step produces the resin having a uniform chemical composition.

9. The method of claim 1, wherein the curing step is performed at a temperature of between 150° C. and 190° C.

10. The method of claim 1, wherein the curing step is performed for a time of between 90 minutes and 120 minutes.

11. The method of claim 1, wherein a resin infusion percentage is greater than 99%.

12. The method of claim 1, wherein the resin-infused mat is free of voids.

13. The method of claim 12, wherein the resin-infused mat comprises less than 3% voids.

14. The method of claim 12, wherein the resin-infused mat comprises less than 1% voids.

15. The method of claim 12, wherein the resin-infused mat comprises less than 0.1% voids.

16. The method of claim 1, wherein the resin-infused mat has a reticularated pore size of no more than 50 nanometers to 100 nanometers (50-100 nm).

* * * * *